United States Patent Office 3,708,342
Patented Jan. 2, 1973

3,708,342
HYDROGEN ELECTRODES FOR FUEL CELLS
Horst Binder, Petterweil, Taunus, Wolfgang H. Kuhn, Frankfurt am Main-Griesheim, Werner Lindner, Niederhochstadt, Taunus, and Gerd Sandstede, Frankfurt am Main, Germany, assignors to Batelle-Institute e.v., Frankfurt am Main, Germany
Filed Jan. 16, 1969, Ser. No. 791,618
Claims priority, application Germany, Jan. 18, 1968, P 16 71 722.9
Int. Cl. H01m 13/02
U.S. Cl. 136—121                          3 Claims

ABSTRACT OF THE DISCLOSURE

Porous electrodes for fuel cells which comprise tungsten carbide, electrically conductive activated carbon and thermoplastic polymer. A process for preparing such electrodes is also disclosed. The electrodes are particularly suitable as porous anodes in low-temperature fuel cells containing acidic electrolytes and utilizing hydrogen fuel.

FIELD OF THE INVENTION

The invention relates to electrodes for fuel cells and is particularly directed to porous anodes for use in hydrogen fuel utilizing low-temperature fuel cells with acidic electrolytes, and to a process for preparing such electrodes.

DESCRIPTION OF THE PRIOR ART

It has previously been found useful to utilize acidic electrolytes in fuel cells which use air as the oxidizing medium. Particularly suitable as electrolytes are sulfuric acid or phosphoric acid, since these acids are not contaminated by carbonate produced by the action of the carbon dioxide in the air or the carbon-containing impurities of the fuel, as is the case with alkaline electrolytes. It should be noted, however, that the catalyzing electrodes used in such cells should be constructed of a material which is immune to attack by acids.

Classically, platinum or other metals of the platinum group have been used as the catalytic agent in fuel cell electrodes. However, it has been found that, although the platinum and platinum group catalysts are initially extraordinarily active, their activity is very rapidly diminished, due to an extreme sensitivity to catalytic poisoning by materials present in the reaction components of the fuel cell. Further, such platinum catalysts are, of course, not only very expensive but their availability is limited. Therefore, much attention has been paid to the search for other suitable catalysts which, although they might not have the initial high activity of the platinum type catalysts, are far less sensitive to catalytic poisoning.

It has been known for some time that certain materials of extremely high hardness are suitable as the principal components of electrodes for fuel cells, since they are acid resistant, electrically conductive, and in some cases actually possess catalytic activity (French Pat. 1,436,504; G. Bianchi et al., Z. physikal. Chem. 226 40–58 (1964)). These materials include the borides, carbides, silicides and nitrides of the metals of Groups 4b thru 7b of the Periodic Table. These metals are members of the group commonly known as transition metals and are generally described as having between 2 and 5 electrons in the respective "d" shells. Specific examples of such metals are titanium, vanadium, chromium, manganese, zirconium, molybdenum, tantalum, tungsten and rhenium.

Electrodes which are intended to contact a gas phase in a fuel cell must be porous so that the gas can be contacted with the electrolyte wet catalyst over as large an area as possible. It will be clear to one skilled in the art that electrodes containing carbides as the catalytic agent may be produced in one of the two basic manners. In the first mode, particles of carbide may be sintered at a high temperature or else the particles may be pressure-bonded with a binder. In the first process the porosity is determined by the manner of carrying out the sintering step. In the second process, it is possible to influence the degree of porosity by the addition of further substances which are later removed, leaving spaces in the material which give rise to the desired porosity. It is known in the art to produce such pores in material by the addition of salts which may either be removed by solution in water or else by decomposition by heating to elevated temperatures.

It has been found that electrodes may be made of tungsten carbide which are most suitable for the processing of hydrogen. However, it has also been found that catalytic electrodes of tungsten carbide suffer from a great practical disadvantage. These electrodes require a rather substantial induction period, or aging process, after placing them in operation in the fuel cell, before they reach their maximum activity. The reason for this induction time is not fully understood; however, it is believed to be influenced by the formation of surface layers of certain oxides or adsorptive layers.

SUMMARY OF THE INVENTION

It is the surprising finding of the present invention that when there is compounded with a high hardness material as mentioned above, most suitably tungsten carbide, between 33 and 1000 parts by weight of finely divided, electrically conductive active carbon, such as activated charcoal, relative to 1000 parts by weight of carbide, the electrodes thus produced reach their full catalytic activity at once and do not require the usual induction period for tungsten carbide electrodes. It should be noted that the tungstein carbide electrodes produced without the presence of active carbon require several days of use prior to reaching their maximum catalytic potential and only then achieve this potential when the structure of the electrode has a hydrophilic character, which property is, in turn, inimical to the mechanical stability of the electrode.

The term active carbon or activated charcoal as used herein describes the forms of carbon, irrespective of their crystallographic structure, which have an inner or interior surface area, as measured by the modes known to the art, of at least 100 m.$^2$/g. While the surface area may be in excess of this figure, it is not advisable that it be less. Though the electrodes would be operative with materials of lower surface area, their efficiency would not be sufficiently enhanced to be commercially desirable.

A further advantage of the electrodes of the present invention as compared with tungsten carbide electrodes devoid of active charcoal resides in their relative lightness, since the specific gravity of charcoal is substantially less than that of tungsten carbide (e.g. carbon: approximately 2, polymers: 0.9–2.2, and tungsten carbide: 15.6).

It should be noted, however, that the mere presence of charcoal in the body of electrodes is not the sole criterion for the preparation of satisfactory tungsten carbide electrodes. The formation of the pores in the electrodes is achieved in a particular manner. Rather than adding to the composition a salt which is then removed—a procedure that should be avoided for the inventive purposes —there are added finely divided polymeric materials under certain conditions of mixing and compounding which will be described hereinbelow.

The advantages of the present invention may be summarized as follows:

(1) The electrodes are electrically conductive even at low contents of tungsten carbide in contrast to those known heretofore which have been prepared by the addition of salts.

(2) The electrodes of the present invention are operative at once without the intermediate step of leaching out the pore-forming substances.

(3) It is an inherent property of the electrodes of the present invention that they may be as hydrophobic in character as desired so that they may be used as gas electrodes without gas over-pressure and they may even be used under certain circumstances where there is a certain electrolyte over-pressure.

DESCRIPTION OF THE PREFERRED EMBODIMENTS

Figure 1:
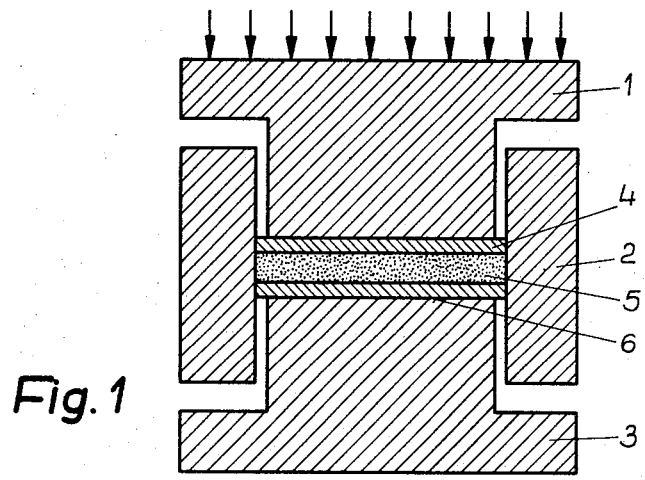
FIG. 1 is a cross section of a schematic representation of a press device for the formation of the electrodes.

In order to produce the electrodes of the present invention it is necessary to follow rather specific procedures —the mere mixing together of the components of the electrode is not sufficient to produce the desired results.

The preferred catalyst for the electrodes of the present invention is tungsten carbide in finely divided form. This finely divided state may be achieved either by grinding the substance down from a coarser form or else by suitable precipitation processes (see, for example, R. Kieffer and F. Benesovsky, Hartstoffe pp. 44 et seq. and 170 et seq. (Vienna (1963)). The size of the tungsten carbide particles should lie between 0.1 and 7 $\mu$m. It is preferred that the particles size be less than 5 $\mu$m. since at particle sizes substantially greater than this diameter the total surface area of the particles is too small to yield commercially desirable results.

The binding material utilized to hold the particles of catalyst together may be polymers of hydrocarbons or halo hydrocarbons for example polyethylene, polypropylene, and the like as well as the corresponding halo derivatives such as polyvinylchloride, polytetrafluorethylene, polytrifluorchlorethylene, and the like. The precisely preferred polymer or mixture of polymers chosen as the binder will depend upon the desired porosity and upon the desired degree of distribution of the charcoal in the completed product.

The charcoal chosen for the production of the electrodes of the present invention should be capable of high electrical conduction and furthermore, is better suited for the purposes of the present invention, if it has a high specific surface. Charcoals suitable for the purposes of the present invention have a specific surface of at least 100 square meters per gram suitably between 100 and 1000 sq. meters per gram. Preferably about 500 sq. meters/gm. Great care should be taken in selecting the charcoal for use in the present invention since it has been found that many of the activated charcoals available in commerce are poor conductors of electricity.

Due to the highly porous character of the charcoal certain precautions must be taken in order to prevent total absorption into the charcoal of the polymeric binder which liquifies during the actual process of manufacturing the electrodes. The charcoal must therefore be pretreated to prevent such absorption. Such pretreatment is carried out prior to mixing the charcoal with the other components of the electrode. Suitably the pretreatment may be carried out by mixing the charcoal with water or with an aqueous suspension of polymer. In the prior modification between 0.5 and 2 grams of water are added per gram charcoal; in the latter case, there is utilized a suspension of polymer containing between 5 and 20 percent by weight of the polymer having a particle size of between 0.05 and 0.2 $\mu$m. There is utilized between 0.5 and 2 grams of such an aqueous suspension, per gram of charcoal (this is about 0.1 gram of solid polymer). In the preferred embodiments of this mode of treatment, there is utilized a suspension of polytetrafluorethylene containing 5% of a nonionic wetting agent as a stabilizer sold under the trade name of "Teflon 30B" manufactured by E. I. du Pont de Nemours & Co. It has been found that this particular suspension is highly suitable for converting the highly porous charcoal into the desired loose lump form.

In the process of the present invention it is preferred to use between 33 and 1000 parts by weight of the charcoal to 1000 parts of weight of catalyst, most suitably of tungsten carbide; and (relative to the final composition of the electrode prior to compression) between 1 and 50 volume percent of thermoplastic polymer. It has been found that utilizing between 10 and 40 volume percent of polyethylene and between 1 and 10 volume percent of polytetrafluorethylene gives rise to a highly desirable product. It should be borne in mind, however, that the invention is operative, utilizing any of the polymers mentioned herein either singly or in mixtures of 2 or more polymers.

FIG. 1 illustrates a cross section of the pressing device. The device comprises a plunger 1, a die 2 and an anvil 3 so disposed that the plunger on the descending stroke would pass through the die 2 onto the anvil 3. In the process of the present invention a thin layer of damp activated charcoal 6 is scattered on anvil 3, the mixture to be compressed 5 is then poured into the die 2 and covered with a second layer of damp activated charcoal 4. In the preferred modification of the process the layer to be compressed is poured into the die 2 directly onto the anvil 3 and covered with charcoal layer 4, the entire press mechanism inverted, anvil 3 removed and charcoal layer 6 scattered upon the underside, now exposed, of layer 5. The purpose of these charcoal layers is to prevent the adhesion of the material to be pressed to the plunger or the anvil in the course of the pressing step, since due to the elevated temperatures of the pressing process the polymer melts and might otherwise adhere to these portions of the pressing mechanism.

The entire pressing device is then placed in a hydraulic press having provision for heating the pressing device. There is applied to the pressing device a pressure of between 0.1 and 10 mp./cm.$^2$, suitably about 1 mp./cm.$^2$ and the pressing device heated to a temperature from about 130 to about 150° C. suitably to 140° C. Where the principal binder is polytetrafluorethylene in place of polyethylene, the heating temperature is raised to a range of 330 to 370° C.

Figure 2:
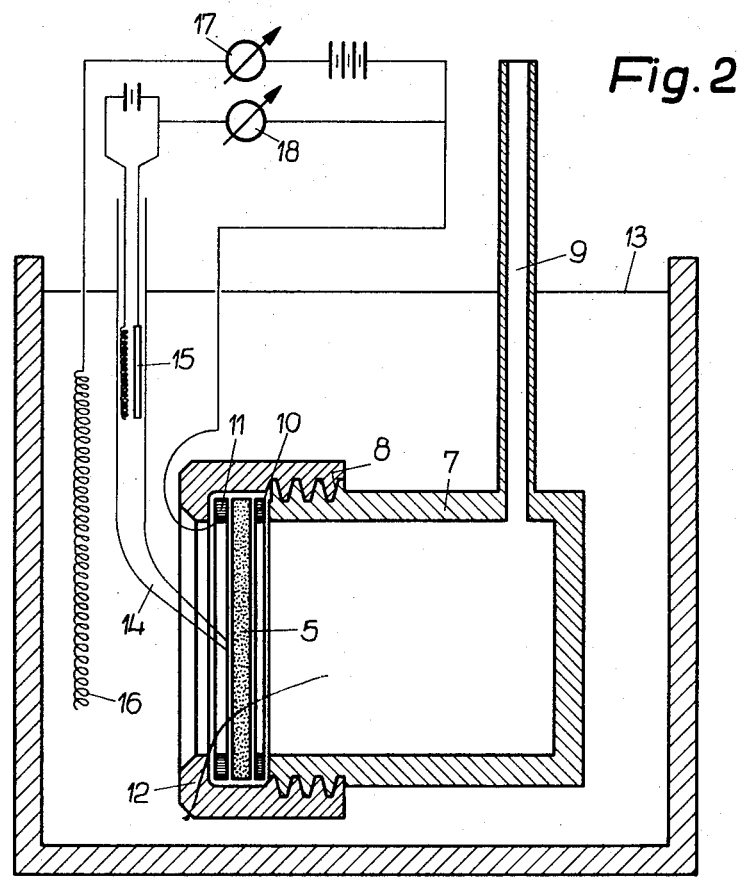
FIG. 2 is a schematic representation of the cross section of a gas electrode in an experimental half cell showing diagrammatic circuitry for measuring the output of the electrode.

Under these conditions the water present in the mixture evaporates in the form of steam, the polymer melts and binds together the charcoal and the tungsten carbide to form a rigid structure. It should be noted that the presence of water vapor or steam in the pores of the charcoal prevents the total absorption therein of the molten polymer. It is also conceivable that the small finely divided particles of polytetrafluorethylene which coat the charcoal particles serve not only as an adhesive between the various particles of the electrodes but similarly preclude the deep penetration of polymer into the charcoal particles. This would not be expected to occur where the principal binder is polytetrafluorethylene. After a period of from about 10 to about 120 minutes, suitably about 30 minutes the pressing device is cooled and is disassembled. The charcoal layers 4 and 6 are at this point dry and readily removed, there thus remains a plate of approximately 3 mm. in thickness having a regular distribution of fine pores therein. The thus formed plate may be built into a device as shown in FIG. 2 and the potential of electrode may be measured against that of a standard hydrogen electrode at various current densities. In an alternative mode charcoal layer 6 is absent, the charge is pressed without heating and a disc of porous polytetrafluorethylene is pressure sealed onto disc 5 by placing such a disc between disc 5 and anvil 3. The sealing pressure is between 0.1 and 10 kp./cm.$^2$ and the sealing temperature is between 130 and 150° C. where the principal binder is polyethylene, and between 330 and 370° C. where it is polytetrafluorethylene.

FIG. 2 illustrates a schematic cross section of a measuring device for gas electrodes and the basic circuit diagram for carrying out such measurements. The illustrated device comprises a cylindrical portion 7 constructed of a transparent synthetic material and provided with a screw thread 8. Into the portion of cylinder 7 proximate to the closed end thereof, there is affixed a gas inlet tube 9. There is placed adjacent to the open end of cylinder 7 an elastic seal 10 and upon seal 10, the electrode sheet 5, and upon sheet 5, an annular contact 11, which contact is suitably made of gold or similar material. The entire combination of portions 10, 5 and 11 is retained upon cylinder 7 by means of a threaded retaining cap 12. The entire combination is submerged in a bath containing the electrolyte 13 and hydrogen is passed into the cell thru tube 9.

A capillary tube 14 is placed adjacent to the front (electrolyte-facing portion) of the electrode 5. In this capillary tube, there is placed a standard or reference electrode 15 in continually developing hydrogen. A current is passed thru electrode 16 via the electrolyte 13 to electrode 5 whose strength is measured by ammeter 17 while the volt meter 18 measures the potential difference between electrode 5 and reference electrode 15.

Figure 3:
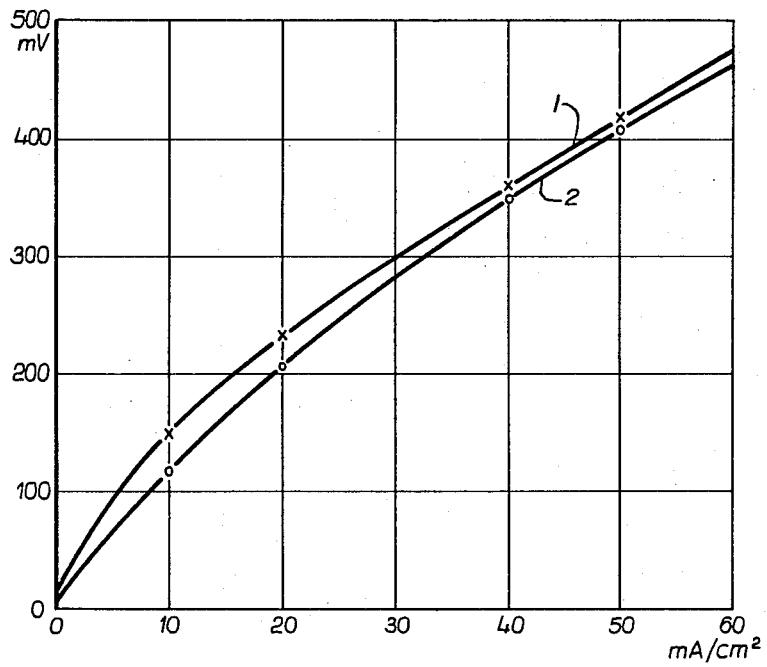
FIG. 3 is a graph showing the relationship of current density with respect to potential of electrodes of this invention.

FIG. 3 illustrates the plot of potential against current for both electrodes prepared as specifically described herein. Curve 1 corresponds to the electrode prepared in accordance with Example 1 and curve 2 corresponds to the electrode prepared in accordance with Example 2 (polytetrafluoroethylene disc). This curve clearly illustrates that the difference in performance between the two electrodes is negligible, thus showing that the presence of the porous polytetrafluoroethylene layer does not hinder the diffusion of hydrogen into the catalytic electrode. It has also been found that in using both electrodes for several days at different current densities little effect is noted upon the current density/potential curve.

In FIG. 3 the X axis corresponds to the current density and the Y axis corresponds to the potential.

Figure 4:
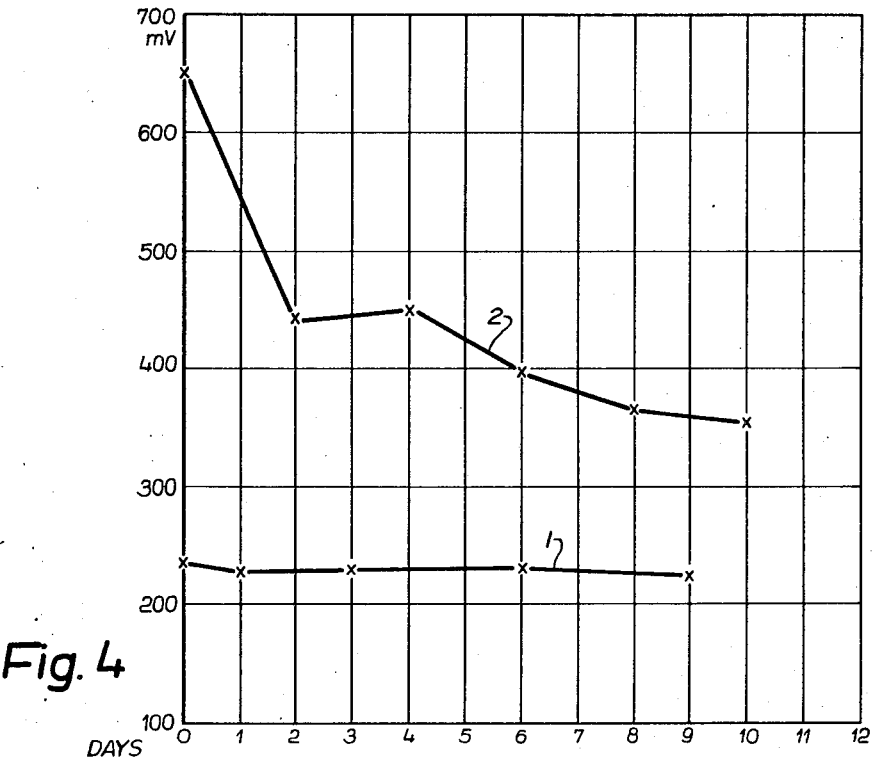
FIG. 4 is a graph plotting the potential of a cell operating at a current density 20 milliamps per square centimeter against time measured in days for a cell having an electrode produced in accordance with the present invention (curve 1) as compared to cell having an electrode of tungsten carbide and polyethylene wherein the pores have been formed by the salt leaching procedure without the presence therein of activated charcoal (curve 2).

FIG. 4 illustrates the surprising absence of initiation time of the electrodes produced in accordance with the present invention. In this graph there is illustrated the potential of the cell created by the electrode at a current density of 20 ma./cm.$^2$ as plotted against time measured in days. Curve 1 corresponds to the readings obtained with an electrode produced in accordance with the present invention and curve 2 corresponds to the results obtained from an electrode comprising tungsten carbide and polyethylene wherein the porosity has been produced by the classical salt leaching process, which electrode does not contain any charcoal. The graph clearly illustrates that the electrode giving rise to curve 2 requires a considerable initiation period while curve 1 shows scarely any variation with time.

In FIG. 4 the X axis shows the time in days and the Y axis shows the potential at a current density of 20 ma./cm.$^2$.

While the above described modes represent the preferred embodiments of the invention, the invention is to be considered to include a further modification which might be desirable though it is not recommended for the generality of uses. It may under certain circumstances, be desirable to increase the mobility of the electrolyte within the body of the electrode itself. This may be achieved by raising the porosity of the electrode into the range of macropores (i.e. pores having a diameter greater than 1 $\mu$m.). Electrodes having such large pores may be prepared by mixing into the general composition consisting of tungsten carbide, charcoal, and polymers, a certain amount, say between 5–30 volume percent of the prepressed composition, of a water soluble salt of the desired grain size. It has been found the sodium sulphate and the like may be used in this connection. The composition is then compressed as described above, and the salt leached out with water in the usual manner. It should be noted however, that in proceeding with this modification attention should be paid to the limits of electrical conductivity and mechanical stability of the desired electrode, since these depend upon the grain size of the added salt and the degree of mixing of the other components. Thus, in practising this modification the advantages must be balanced against the disadvantages inherent therein in each individual case. It should be borne in mind that in adding the salt certain of the initial advantages of the principal mode of the invention may be lost.

EXAMPLE I

In order to prepare an electrode containing 30 volume percent of tungsten carbide, 37 volume percent of charcoal 30 volume percent of polyethylene and 3 volume percent of polytetrafluoroethylene there are weighed out 8 grams, 1.4 grams, 0.5 gram, 0.1 gram respectively of these substances. For this purpose 0.2 ml. of a polytetrafluoroethylene suspension having a particle size of 0.2 $\mu$m. (approx.) which contains 50% by weight of solid material is diluted with 1 ml. of water. The diluted suspension is added to the charcoal in a mortar. The mixture is ground in the mortar with a pestle. The suspension is entirely absorbed by the charcoal. The tungsten carbide is then added and mixed together with the charcoal in a similar manner. The polyethylene is then added and the mixture thoroughly ground together to yield a flaky, platelet-like mass. The mixture is placed in a beater mill for a few seconds and ground to a powder. The powder is paced in a cylindrical mold having a diameter of 48 mm. and compressed in a hydraulic press under a pressure of 1 mp./cm.$^2$ at a temperature of 140 ° C. for about 30 minutes in the manner described in detail hereinabove.

When the electrode 5 is produced in accordance with the procedures set forth in Example 1, it is found that the electrode though slightly penetrated by electrolyte (equivalent to 20 centimeters of water pressure) permits the passage of small gas bubbles into the electrolyte. However, after a few hours the penetration of the electrode by the electrolyte due to wetting becomes stronger, and drops of electrolyte are noted on the inner, or gas, side of the electrode if the gas pressure is not maintained at a sufficient level to ensure the presence of small gas bubbles on the electrolyte side.

Although it is possible to carry out potential measurements under these conditions, it is necessary, in order to produce an electrode suitable in a practical fuel cell to provide the electrode with substantially hydrophobic properties. This aim may be achieved by coating the gas side of the electrode produced in accordance with Example 1 with a film of porous unwettable material, most suitaly polytetrafluorethylene. In order to ensure adequate bonding of the electrode with such a layer the process of Example 1 may suitably be modified in accordance with the procedure of Example 2 below.

EXAMPLE 2

The components are prepared in the same manner as in Example 1. However, the component mass 5 is placed in the pressing device without the presence of the charcoal layer 6. The pressing device is then placed in the hydraulic press and similarly subjected to a similar pressure without the heating step of Example 1. The device is inverted, the anvil 3 is then removed and a very small amount of polyethylene powder is dusted upon the exposed surface of the disc 5. It is vital that the amount of powder be so small that the individual particles of the polyethylene powder remain visible. Under no circumstances should the entire electrode surface become covered therewith, otherwise the pores of the sheet of porous polytetrafluorethylene to be added at this point will become blocked. Such porous polytetrafluorethylene is available in commerce. A sheet of such porous polytetrafluorethylene material approximately 1 mm. in thickness and having a shape corresponding exactly to electrode 5 is now placed upon the polyethylene dusted electrode 5. Anvil 3 is now thoroughly cleansed of any charcoal particles and replaced in the pressing device. The pressing device is then replaced in a hydraulic press fitted with a heating device and compressed under a pressure of between 0.1 and 10 kp./cm.$^2$ at a temperature of between 130 and 150° C. suitably at about 150° C. Where the principal binder is polytetrafluorethylene itself this sealing temperature is raised to 330–370° C., and also in this case powdered polytetrafluorethylene is used in place of polyethylene as the sealant powder. It is important that the designated pressure not be exceeded. Under these conditions the sprinkled layer of polymer powder melts and bonds the tungsten carbide/carbon mass to the polytetrafluorethylene film. After approximately 30 minutes, the electrode 5 may be removed from the pressing device and freed from the adjacent charcoal layer 4.

Where an electrode produced in accordance with this method is built into a device as shown in FIG. 2, it is noted that even with an electrolyte over-pressure of several centimeters of water the electrode may be kept in operation for many days without the penetration of the liquid into the gas side of the electrode.

It will be understood that various changes may be made in the preferred forms of the process and product hereof without departing from the scope of the present invention; the preceding description is therefore intended as illustrative only and should not be construed in a limiting sense.

We claim:

1. A porous electrode, for use in a hydrogen-utilizing fuel cell operating with acidic electrolytes, and not requiring any aging time so that the electrode has full activity immediately, said electrode consisting essentially of a thorough admixture of tungsten carbide, electrically conductive activated charcoal, and a binder of at least one thermoplastic polymer; said tungsten carbide being in finely divided form with a particle size of 0.1–7 $\mu$m.; said activated charcoal being pretreated to prevent binder absorption, and having a high specific surface of at least 500 m.$^2$/g.

2. The electrode of claim 1 wherein there are present between 33 and 1000 parts by weight of charcoal per 1000 parts by weight of tungsten carbide, and there are utilized as the thermoplastic polymers between 1 and 10 volume percent of polytetrafluoroethylene and between 10 and 40 volume percent of polyethylene based upon the volume of the total components of the electrode.

3. The electrode of claim 2 having bonded to one face thereof a layer of porous polytetrafluorethylene.

References Cited

UNITED STATES PATENTS

| | | | |
|---|---|---|---|
| 3,097,974 | 7/1963 | McEvoy et al. | 136—120 |
| 3,346,421 | 10/1967 | Thompson et al. | 136—86 X |
| 3,380,856 | 4/1968 | Pohl | 136—120 |

FOREIGN PATENTS

| | | | |
|---|---|---|---|
| 1,296,819 | 5/1962 | France | 136—120 |
| 6715527 | 5/1968 | Netherlands | 136—120 |
| 1,119,999 | 7/1968 | Great Britain | 136—120 |
| 1,135,076 | 11/1968 | Great Britain | 136—120 |

WINSTON A. DOUGLAS, Primary Examiner

M. J. ANDREWS, Assistant Examiner